US008272299B2

(12) United States Patent
Urick, Sr.

(10) Patent No.: US 8,272,299 B2
(45) Date of Patent: Sep. 25, 2012

(54) TOOL FOR FREEING SEIZED BOLTS

(75) Inventor: Vincent J. Urick, Sr., Paxinos, PA (US)

(73) Assignee: Lisle Corporation, Clarinda, IA (US)

( * ) Notice: Subject to any disclaimer, the term of this patent is extended or adjusted under 35 U.S.C. 154(b) by 310 days.

(21) Appl. No.: 12/715,210

(22) Filed: Mar. 1, 2010

(65) Prior Publication Data

US 2011/0209587 A1 Sep. 1, 2011

(51) Int. Cl.
*B25B 13/06* (2006.01)
*B23P 19/04* (2006.01)

(52) U.S. Cl. ........................ 81/121.1; 81/53.2; 29/426.5

(58) Field of Classification Search ................. 81/121.1, 81/53.2, 436, 125; D8/29, 46; 173/90, 91; 29/426.5

See application file for complete search history.

(56) References Cited

U.S. PATENT DOCUMENTS

| | | | | |
|---|---|---|---|---|
| 985,087 | A * | 2/1911 | Wilson | 81/121.1 |
| D142,054 | S * | 8/1945 | Young | D8/29 |
| 2,507,167 | A * | 5/1950 | Lemmerman | 173/93.7 |
| 2,936,010 | A * | 5/1960 | Ansingh | 81/436 |
| 3,666,023 | A | 5/1972 | Sakamoto | |
| 4,794,830 | A | 1/1989 | Gross et al. | |
| 4,805,495 | A | 2/1989 | Tauber | |
| D359,669 | S * | 6/1995 | Splingaire | D8/29 |
| 5,526,722 | A | 6/1996 | Limehouse | |
| 5,638,909 | A | 6/1997 | Henderson | |
| 5,791,208 | A * | 8/1998 | Grubbs | 81/121.1 |
| 6,609,577 | B2 | 8/2003 | Beccu | |
| 7,077,037 | B2 * | 7/2006 | Shevela et al. | 81/436 |
| 7,089,833 | B2 | 8/2006 | Hamann et al. | |
| 7,712,838 | B2 * | 5/2010 | Walker et al. | 299/11 |

* cited by examiner

*Primary Examiner* — David B Thomas
(74) *Attorney, Agent, or Firm* — Banner & Witcoff, Ltd.

(57) ABSTRACT

A tool may loosen seized bolts by sending shock waves into the bolt shank and thread areas via axial blows from a pneumatic hammer on the center of the bolt head prior to removal. The tool may allow impacts to be centered on the bolt head without damaging the bolt head or without worry of the bit jumping off the bolt.

15 Claims, 2 Drawing Sheets

TOOL FOR FREEING SEIZED BOLTS

BACKGROUND OF THE INVENTION

The present invention relates to apparatus and methods for freeing seized bolts and, more particularly, to an air hammer bit that may loosen seized bolts by impacting bolt head centers.

Presently, there are many components in the automotive industry and elsewhere that are being manufactured from lightweight metals, especially aluminum, because of its weight and strength. Steel bolts, however, continue to be used as fasteners for these components. When steel bolts pass through or are threaded into aluminum or other lightweight metal parts, the steel bolts can become seized over time due to galvanic reactions between the two different metals. These bolts often become difficult to remove usually resulting in damage to the bolt or to the component. Frustrated technicians will strike the head of a seized bolt with a punch or hammer in an attempt to loosen them.

Pneumatic hammers have also been used with a punch bit, usually resulting in the bit jumping off the bolt head and damaging the hex head of the bolt, making it hard to fit a wrench or socket to it again. The majority of the impacts from these punch bits hit squarely on the head of the bolt, transferring the shocks to the metal at the circumferential base of the bolt head, greatly absorbing and reducing the effect of the impact force instead of concentrating impacts on the center of the bolt head, where the impacts may be more effective in being transferred to the shank and threads of the bolt, thereby breaking up rust and corrosion. Many components in the automotive, construction and other fields are ruined due to failed attempts to extract seized bolts. Parts replacement and labor costs increase as a result.

As can be seen, there is a need for a tool that may apply an impact on the center of a bolt head without slipping off the bolt head and damaging the bolt.

SUMMARY OF THE INVENTION

In one aspect of the present invention, a tool comprises a front end attached to a shaft; an opening in the front end, the opening fitting about a bolt head; and a raised convex center in the opening, wherein the raised convex center contacts a bolt head when the bolt head is placed within the opening.

In another aspect of the present invention, a tool comprises a front end attached to a first end of a main shaft; a stub shaft attached to a second, opposite end of the main shaft; and a raised tool flare is disposed about the shaft, wherein the front end fits within an engagement opening in a bolt head.

In a further aspect of the present invention, a method for freeing seized bolts comprises attaching a tool to a pneumatic hammer, the tool having a front end attached to a shaft; an opening in the front end, and a raised convex center in the opening; fitting the opening about a bolt head; and activating the pneumatic hammer to cause the raised convex center to strike the bolt head.

These and other features, aspects and advantages of the present invention will become better understood with reference to the following drawings, description and claims.

DETAILED DESCRIPTION OF THE INVENTION

The following detailed description is of the best currently contemplated modes of carrying out exemplary embodiments of the invention. The description is not to be taken in a limiting sense, but is made merely for the purpose of illustrating the general principles of the invention, since the scope of the invention is best defined by the appended claims.

Various inventive features are described below that can each be used independently of one another or in combination with other features.

Broadly, an embodiment of the present invention provides a tool that may loosen seized bolts by sending shock waves into the bolt shank and thread areas via axial blows from a pneumatic hammer on the center of the bolt head prior to removal. The tool, according to an embodiment of the invention, may allow impacts to be centered on the bolt head without damaging the bolt head or without worry of the bit jumping off the bolt.

Figure 1:
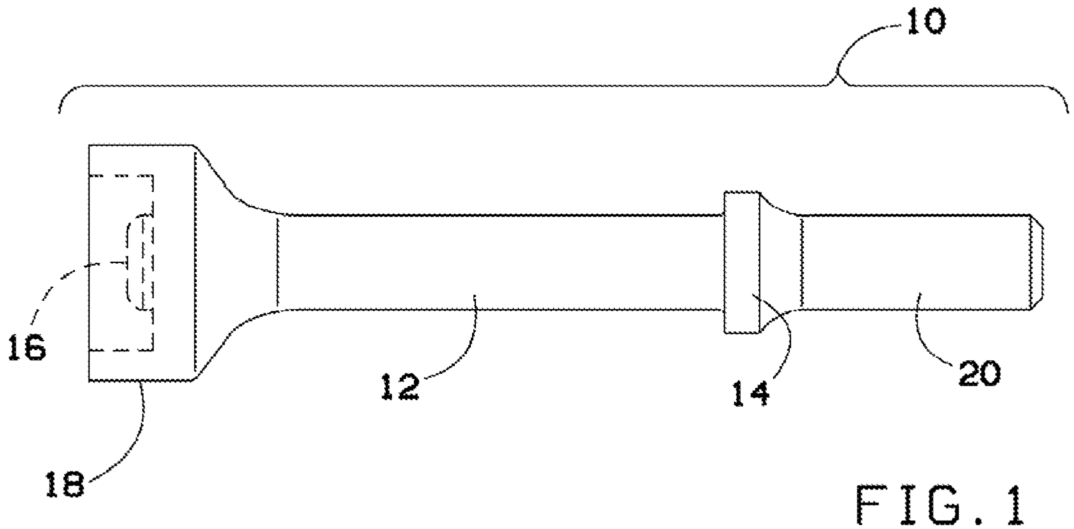
FIG. 1 is a side view of a tool according to an embodiment of the present invention.
Figure 2:
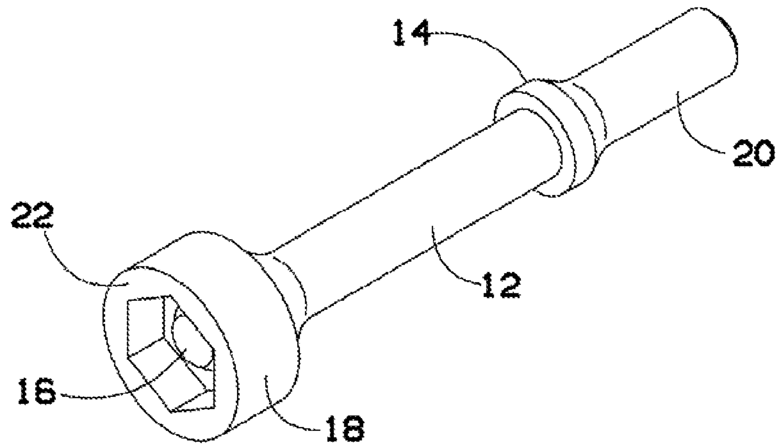
FIG. 2 is a perspective view of the tool of FIG. 1.
Figure 6:
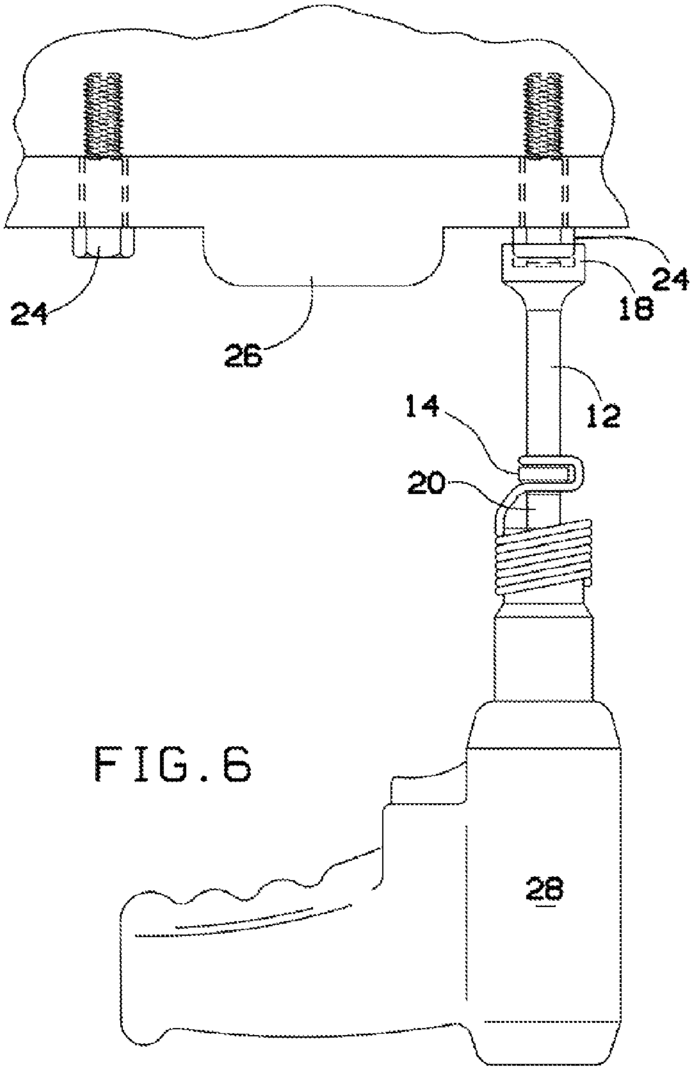
FIG. 6 is a perspective view of the tool of FIG. 1 attached to a pneumatic hammer.

Referring to FIGS. 1-4, there is shown a tool 10 according to an embodiment of the present invention. The tool 10 may be used with a pneumatic hammer 28, as shown in FIG. 6. The tool 10 may be made of steel, typically hardened steel, or any other material capable of providing blows to a bolt head 24, such as tungsten, tungsten alloys (such as tungsten carbide), titanium or the like. The tool 10 may have a main shaft 12 and a stub shaft 20. The stub shaft 20 may fit into a power tool, such as the pneumatic hammer 28. A front end 18 of the tool 10 may have an opening 22 sized to fit about the bolt head 24. The tool 10 may be configured with various sized and shaped openings 22. For example, the opening 22 may fit metric and standard sized bolt heads. The opening 22 may be shaped to fit hex heads (as shown in FIG. 2), twelve point heads, or the like.

The opening 22 at the front end 18 of the tool 10 may have a depth 40 that is less than the height 42 of the bolt head 24. This size feature may prevent a front face 22 of the tool 10 from damaging a component 44 when the tool 10 is in use, as shown in FIG. 6.

Figure 3:
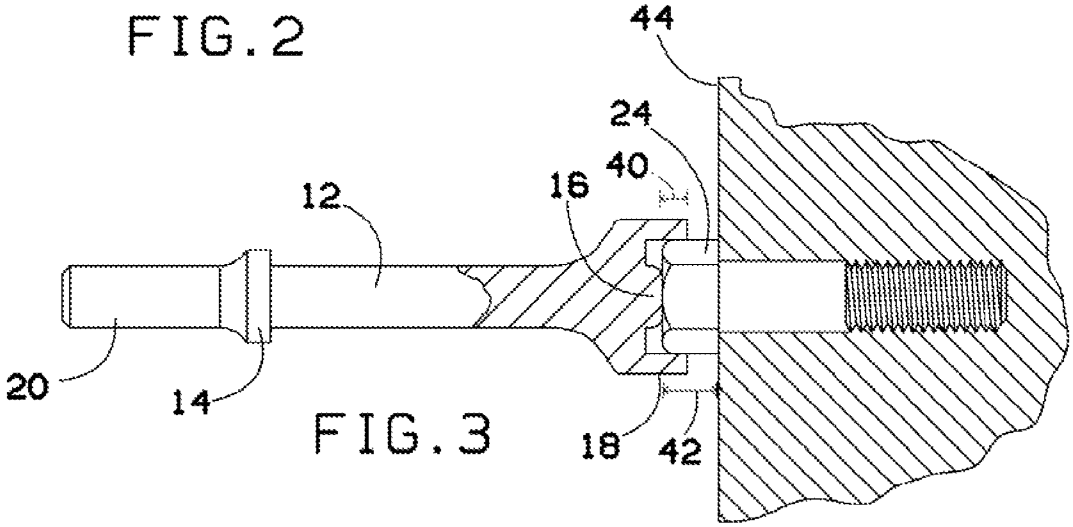
FIG. 3 is a partial cross-sectional view of the tool of FIG. 1 in use.
Figure 4:
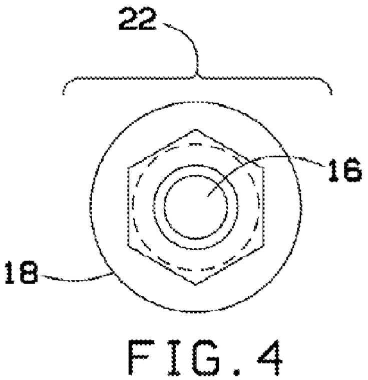
FIG. 4 is a front view of the tool of FIG. 1.

The tool 10 may have a raised center 16 within the opening 22. This raised center 16 may be a raised convex center capable of impacting a center of the bolt head 24, as shown in FIG. 3.

The stub shaft 20 may include a raised tool flare 14 which may facilitate attaching the tool 10 to the pneumatic hammer 28. In one embodiment, the stub shaft 20 may be made to the automotive tool standard 0.401 Parker Taper Shank end designed to be used with any automotive pneumatic hammer.

The tool 10 may be a one-piece design, where a separate tool 10 may be used for each size bolt head 24. In an alternate embodiment, the front end 18 may be removable, fitting on the main shaft 12 by, for example, a typical locking spring loaded detent ball or pin. The tool 10 may have various overall lengths, depending on the application. For example, the main shaft 12 may have a 0.5 inch cross-sectional thickness and may be from about 1 to about 14 inches in length. The main shaft 12 could also be any other shape such as a rod possibly having a hexagonal or square cross section. The stub shaft 20 may be, typically, about 1.3 inches in length with a cross-sectional thickness of about 0.4 inch.

Figure 5:
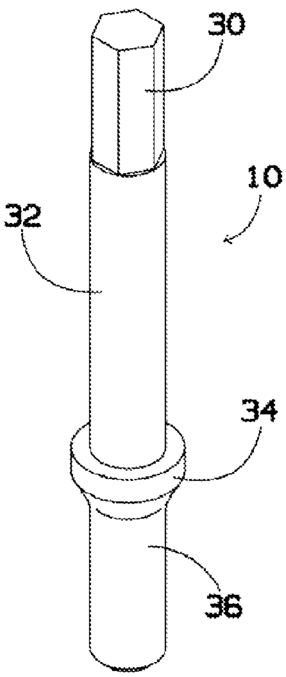
FIG. 5 is a perspective view of an alternate embodiment of the present invention.

Referring to FIG. 5, in an alternate embodiment, a tool 10' may have a stub shaft 36, raised tool flare 34 and main shaft 32 similar to the tool 10 described above. A front end 30 of the tool 10', however, may have a shape of an Allen head, for example. In this embodiment, the Allen head front end 30 may fit into an engagement opening in a bolt. The engagement opening may be hexagonal shaped, such as an Allen head bolt (not shown). Alternatively, the front end 30 may have a square shape (not shown) to fit into square drive bolts or a star shape (not shown) to fit into Torx® head bolts.

Referring to FIG. 6, there is shown a method for using the tool 10 according to an embodiment of the invention. The pneumatic hammer 28 may hold the tool 10. The front end 18 of the tool 10 may fit onto the bolt head 24 of a bolt within a component, such as an exhaust manifold 26. By operating the pneumatic hammer 28, the tool 10 may impact the bolt head 24 without becoming disengaged from the bolt head 24.

It should be understood, of course, that the foregoing relates to exemplary embodiments of the invention and that modifications may be made without departing from the spirit and scope of the invention as set forth in the following claims.

We claim:

1. A tool for removing a seized bolt having a bolt head, said bolt head having a height and an axial center, said tool comprising:

a front end attached to a shaft;

a center opening in the front end, the opening shaped and sized for fitting about a said bolt head said opening having an axial depth, said axial depth having a center less than the height of a said bolt head, wherein the center contacts a said bolt head when a said bolt head is placed within the opening.

2. The tool of claim 1, wherein the shaft includes a main shaft and a stub shaft.

3. The tool of claim 1, wherein a raised tool flare is disposed about the shaft.

4. The tool of claim 3, wherein:

the shaft includes a main shaft and a stub shaft; and the stub shaft; and the raised tool flare meet automobile tool industry standards for attaching a pneumatic hammer onto the stub shaft.

5. The tool of claim 1, wherein the front end is removably attached to the shaft.

6. The tool of claim 1, wherein the engagement opening is selected from the group consisting of a hexagonal shape, a square shape and a star shape.

7. A method for freeing seized bolts, the method comprising:

attaching a tool to a pneumatic hammer, the tool having a front end attached to a shaft; an opening in the front end, and a raised convex center in the opening;

fitting the opening about a bolt head; and activating the pneumatic hammer to cause the raised convex center to strike the bolt head.

8. The method of claim 7, further comprising selecting the opening to match the size of the bolt head, thereby reducing damage to the bolt head shape when striking the bolt head with the raised convex center.

9. A tool comprising:

a front end attached to a shaft;

an opening in the front end, said opening shaped for fitting about a bolt head; and a raised center in the opening, wherein the raised center contacts a bolt head when the bolt head is placed within said opening; said shaft including a main shaft and a stub shaft.

10. A tool comprising:

a front end attached to a shaft;

an opening in the front end, said opening shaped for fitting about a bolt head; and a raised convex center in the opening, wherein the raised convex center contacts a bolt head when the bolt head is placed within the opening; and a raised tool flare disposed about the shaft.

11. The tool of claim 10, wherein:

the shaft includes a main shaft and a stub shaft; and the stub shaft; and the raised tool flare meet automobile tool industry standards for attaching a pneumatic hammer onto the stub shaft.

12. A tool for removing a seized bolt having a bolt head, said bolt head having a height, said tool comprising:

a front end attached to a shaft with an axis;

an axial opening in the front end, the opening sized for fitting about a said bolt head; and an axial center impacting element in the opening, wherein the axial center impacting element contacts a bolt head when a said bolt head is placed within the opening for reciprocally, axially impacting a said seized bolt.

13. The tool of claim 12, wherein the axial depth of the opening is less than the height of a said bolt head.

14. The tool of claim 12 wherein the center is raised.

15. The tool of claim 14 wherein the center is convex.

* * * * *